March 27, 1956 — R. HEIDECKE — 2,739,515
TRANSPARENT FILM GUIDE FOR PHOTOGRAPHIC CAMERAS
Filed Jan. 30, 1953
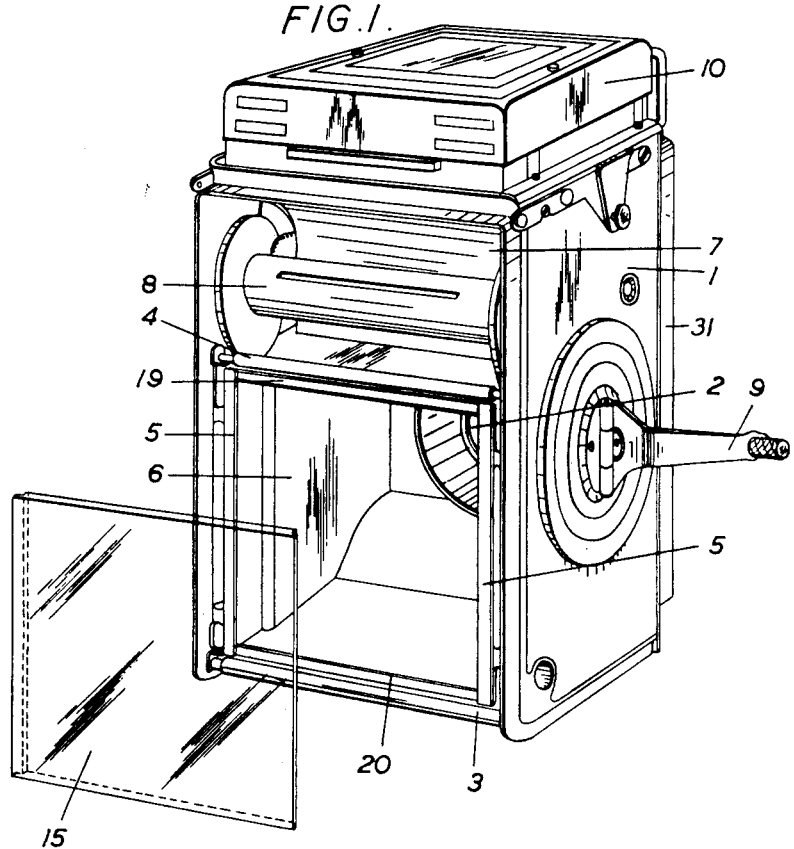
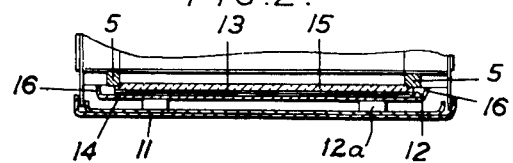
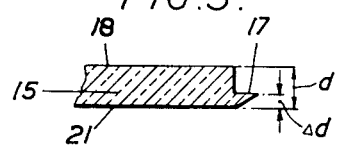
INVENTOR,
Reinhold Heidecke
BY Charles Shepard
ATTORNEY United States Patent Office 2,739,515
Patented Mar. 27, 1956

2,739,515

TRANSPARENT FILM GUIDE FOR PHOTOGRAPHIC CAMERAS

Reinhold Heidecke, Braunschweig, Germany, assignor to Franke & Heidecke, Fabrik Photographischer Prazisions-Apparate, Braunschweig, Germany, a firm Application January 30, 1953, Serial No. 334,194

Claims priority, application Germany January 30, 1952

2 Claims. (Cl. 95—31)

This invention relates to cameras, particularly to roll film cameras of the reflex type in which the focusing element and exposure element are mounted in the same case. The focusing and exposure lenses have the same focal length so that when a sharp image is formed by the focusing lens on the ground glass an equally sharp image is simultaneously formed in the focal plane of the camera or on a sensitive element arranged therein. In cameras of this type, the sensitive film is unwound from one spool, passes through the focal plane where it is exposed, and the exposed film then wound on a receiving or take-up spool. In its path from the unexposed roll to the focal plane, the film moves in a path at substantially right angles to itself with the result that the film has a tendency to bulge in the focal plane so that a portion of the film projects from the focal plane, resulting in a distorted image.

It is one of the objects of this invention to provide simple and inexpensive means for maintaining the film in parallel relation with the focal plane of the lens in its passage from the unexposed spool to the exposed or winding spool.

Another object of the invention is to provide means for maintaining the film in a flat condition in or substantially parallel with the focal plane of a camera by arranging a sheet of transparent material, such as glass, in contact therewith and between it and the lens.

Still another object of the invention is to provide a passageway for the film at the focal plane to guide and maintain the film in a substantially plane condition when in exposure position.

A further object of the invention is to provide a transparent plate supported on the lateral film guides and arranged in the focal plane of the camera in front of the film, said plate being provided with offset lateral shoulders to engage the rear faces of said film guides and to hold the plate in such position that the rear face of the plate is displaced rearwardly from the normal focal plane of the camera by exactly the same distance as that by which the focal plane itself is displaced due to the passage of the light rays through the plate, thus making the plate self-compensating and eliminating the need for any focal correction due to the presence of the plate.

Still another object of the invention is the provision of improved means for maintaining the film in a roll film camera in a plane condition in the focal plane of a camera, said means being adapted to be removed when the camera is used with a plate or miniature film adapter.

Another object of the invention is to provide a transparent plate in front of and adjacent to the film, which plate may have its front face treated for non-reflection and may also serve as a ray filter.

These and other desirable objects may be attained in the manner disclosed as an illustrative embodiment of the invention in the following description and in the accompanying drawings forming a part hereof, in which:

Fig. 1 is a perspective rear view of a camera, the rear wall being removed to illustrate one possible embodiment of the invention;

Fig. 2 is a transverse horizontal section through the focal plane of the camera, and Fig. 3 is an enlarged section through a fragment of the transparent plate of the present invention.

The same reference numerals throughout the several views indicate the same parts.

Referring specifically to the drawings, 1 indicates a reflex focusing camera of usual or conventional form having a lens 2, and the usual rotatable film guide rollers 3 and 4, the roller 3 being mounted in the side walls of the camera near the bottom thereof and the roller 4 being mounted in said side walls above the picture aperture and in parallel relation to the roller 3. Lateral film supports 5 in the form of stationary rails or guides are supported by the side walls or other frame members of the camera, and with the rollers 3 and 4 define the focal plane or field of the camera.

A spool or roll of unexposed film, not shown, is mounted in the usual spool chamber of the camera near its base and forwardly of the guide roller 3. From this spool, the film is lead under and to the rear of the roller 3 and up over the roller 4 to the winding or take-up roller 8 for the exposed film, the roller 8 being revolubly mounted in the film chamber 7 at the top of the camera. The roller 8 is conveniently operated from the exterior of the camera by any suitable means, such as the crank 9, to wind the film thereon. At its top the camera is provided with the usual ground glass plate or other suitable focusing screen, associated with which is the usual collapsible focusing hood indicated in general at 10. The camera also includes a focusing front member 31 on which are mounted the picture-taking lens 2 and the finder lens (not shown) above the picture-taking lens, and a suitable focus adjusting member (e. g., a knob on the left side of the camera body) by which the front member 31 may be moved forwardly and rearwardly relative to the main camera body to focus the finder lens image sharply on the focusing screen. As usual in cameras of this type (so-called twin lens reflex cameras) the two lenses are of the same focal length, and the optical path from the finder lens to the focusing screen is the same length as the optical path from the picture lens 2 to the focal plane defined by the rear faces of the rails or guides 5, so that whenever the front member 31 has been moved to a position in which the image of an object to be photographed is sharply focused on the screen, it will be known that the image of the object is likewise sharply focused on the theoretical normal focal plane defined by the guides 5.

Mounted on the rear wall 11 of the camera is a plate 12 resiliently pressed forward by the springs 12a, see Fig. 2. The plate 12 is adapted to engage the film 13 in the focal plane when the back of the camera is seated thereon and presses the film against the guide rollers 3 and 4 and the lateral film guides or supports 5, the forwardly bent side edges 16 cooperating with the lateral supports 5 to form a channel for the film. The lens of the focusing element forms an image on the ground glass simultaneously with the formation of an equally sharp image by the camera lens in the focal plane of the camera or a film arranged on the rollers 3 and 4 in said focal plane.

The parts described above are of usual or conventional form, and the details thereof do not form a material part of the present invention.

It will be noted that as the film moves from its unexposed roll to the focal plane it is bent sharply around the roller 3, which imparts to the film a tendency to curl or bulge as it moves into the focal plane. In order to prevent this curling of the film a transparent plate of glass or other transparent material 15 having substantially parallel faces is arranged between the film and the lateral supports in the focal plane of the camera, with the front face of the film in contact with the rear face of the transparent plate.

It has heretofore been suggested to support the film by a transparent plate in front of the film. However, in the prior construction the full thickness of the transparent plate has rested against the guide rails 5 or other supports which define the focal plane, with the result that the position of the film, when taking a picture, has been displaced rearwardly through a distance equal to the full thickness of the glass plate. This has destroyed the equality of the optical paths in the picture taking chamber and the finder chamber, and thus has interfered with correct focusing, unless special adjustments or allowances are made, which special adjustments or allowances are difficult and undesirable if the camera is to be used at times with the glass plate and at other times without the glass plate (e. g., with the glass plate removed to permit the insertion of a miniature film adapter or a plate adapter).

The present invention is based on the surprising discovery that, contrary to the teaching of the prior art, a glass (or other transparent) plate may be used as a film flattener or film support in front of the film, without interfering in any way with the focusing of a twin lens reflux camera, if the transparent plate is so arranged that only a certain minor part of the thickness of the plate lies to the rear of the normal focal plane of the camera, and a certain major part of such thickness lies in front of the normal focal plane. Preferably the plate is supported in this position by means of flanges or shoulders formed directly on the plate itself. To this end, the transparent plate 15, according to the present invention, is provided with lateral shoulders or projections 17 arranged to engage against and overlap with the rear faces of the film guide strips or rails 5. The front faces of the lateral projections 17 lie in the same plane with each other and in a plane parallel to the front and rear faces 18 and 21 of the plate, so that these faces 18 and 21 are strictly parallel with the focal plane of the camera. The front face 18 of the glass plate lies between the guide strips 5 and anchors the plate against lateral displacement. The width of the rear face 21 of the plate 15 is preferably at least equal to, or a little wider than, the width of the film, and has a height covering the full distance between the top and bottom frame members 19 and 20 outlining the picture area, so that the entire picture area or exposure area of the film is held flat and prevented from buckling.

When the rays of light must pass through the transparent plate in travelling from the lens to the film, the effect of the transparent plate is to lengthen the lens-to-image distance by an amount equal to $$d \cdot \frac{n-1}{n}$$

where $d$ is the thickness of the transparent plate, and $n$ is the index of refraction of the glass or other transparent material of which the plate is made. For ordinary glass, the index of refraction is about 1.5, so that the image displacement is about $d/3$. The image displacement may be designated as $\Delta d$.

According to the present invention, the rear face 21 of the transparent plate 15 is positioned rearwardly from the normal focal plane (defined by the faces of the guides or rails 5) by this same distance $\Delta d$ by which the image is displaced. Consequently, when the position of the plate is determined by supporting shoulders or flanges formed integrally on the plate, these shoulders 17 are placed at a distance $\Delta d$ forwardly from the plane of the rear surface 21, as seen in Fig. 3. Thus when the shoulders 17 are positioned against the guide rails 5 which define the normal focal plane, it follows that the rear or film-flattening face 21 of the plate will be spaced the distance $\Delta d$ rearwardly from the normal focal plane, which is precisely the same distance by which the optical image is displaced rearwardly, due to the passage of the light rays through the thickness of the plate. This position of the rear face of the plate automatically compensates for the error that would otherwise be caused by the passage of the light rays through the plate, and keeps the focusing of the camera in its exact correlation or synchronism with the focusing of the finder.

As above indicated, the distance $\Delta d$ is equal to $d/3$ when the plate 15 has an index of refraction of 1.5. In making such a transparent plate, the index of refraction would be ascertained and the position of the shoulder 17 would be varied accordingly. For all ordinary materials likely to be used in making transparent plates for present purposes, the distance $\Delta d$ would be less than $d/2$, so that in all ordinary cases the rear face 21 would be positioned rearwardly of the normal focal plane by a distance constituting a minor part of the thickness of the plate, and the front face 18 would be positioned forwardly of the normal focal plane by a distance constituting a major part of the thickness of the plate.

Ordinarily when used in a film camera, it is only necessary to insert the transparent plate 15 in the camera, placing the shoulders 17 against the rails 5, and attach the film to the winding spool and close the camera by replacing the back thereon. Replacing the back confines the film between the transparent plate 15 and the presser plate 12 which resiliently engages the rear thereof. The camera is then operated in the usual manner.

If a miniature film adapter is to be used in the camera, the miniature film adapter or film holder is inserted to rest on the film guide members 3, 4, and 5, in order that its film may be passed through the focal plane. This is easily done by taking out the transparent plate. If the camera is intended for use also with glass plates or cut films, the glass plate is also unnecessary, and is removed when the camera is thus employed.

In all cases, the presence or absence of the glass plate does not require special adjustment nor affect focusing in any way, and so the operation of the camera is always performed in the same way, regardless of the presence or absence of the transparent plate.

In order to reduce internal reflections, the transparent plate may be treated in any known manner to reduce surface reflections. This transparent plate may also be formed as a suitable ray filter to reduce or eliminate those colors of light which are undesired.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A twin lens reflex view finder camera comprising a photographic lens shiftable for focusing, abutment means defining a normal focal plane at which an image is normally focused by said lens, means for feeding unexposed film to the focal plane, a removable transparent plate adapted to be placed approximately in said focal plane and in front of the film to support the film against forward bulging in the exposure area of the focal plane, and means on said plate for engaging said abutment means for removably supporting said plate in such position that the rear face of said plate is parallel to said normal focal plane and at a distance rearwardly from said normal focal plane equal to a minor part of the thickness of said plate to compensate for the increase in lens to image distance caused by the passage of light rays through said transparent plate, whereby said camera is adapted to operate interchangeably with or without said transparent plate.

2. A construction as defined in claim 1, in which said supporting means supports said plate with its rear face at a distance rearwardly from said normal focal plane substantially equal to $$d \cdot \frac{n-1}{n}$$

where $d$ is the thickness of the plate and $n$ is the index of refraction of the transparent material from which the plate is made.

References Cited in the file of this patent

UNITED STATES PATENTS

| | | |
|---|---|---|
| 1,275,573 | Lichtenstein | Aug. 13, 1918 |
| 1,590,448 | Shore | June 29, 1926 |
| 2,371,611 | Dimmick | Mar. 20, 1945 |

FOREIGN PATENTS

| | | |
|---|---|---|
| 228,670 | Switzerland | Sept. 15, 1943 |